Nov. 13, 1956  T. F. McCARTHY  2,770,378
SCRAPER LOADER APPARATUS FOR MINES
Filed Dec. 21, 1953  4 Sheets-Sheet 4

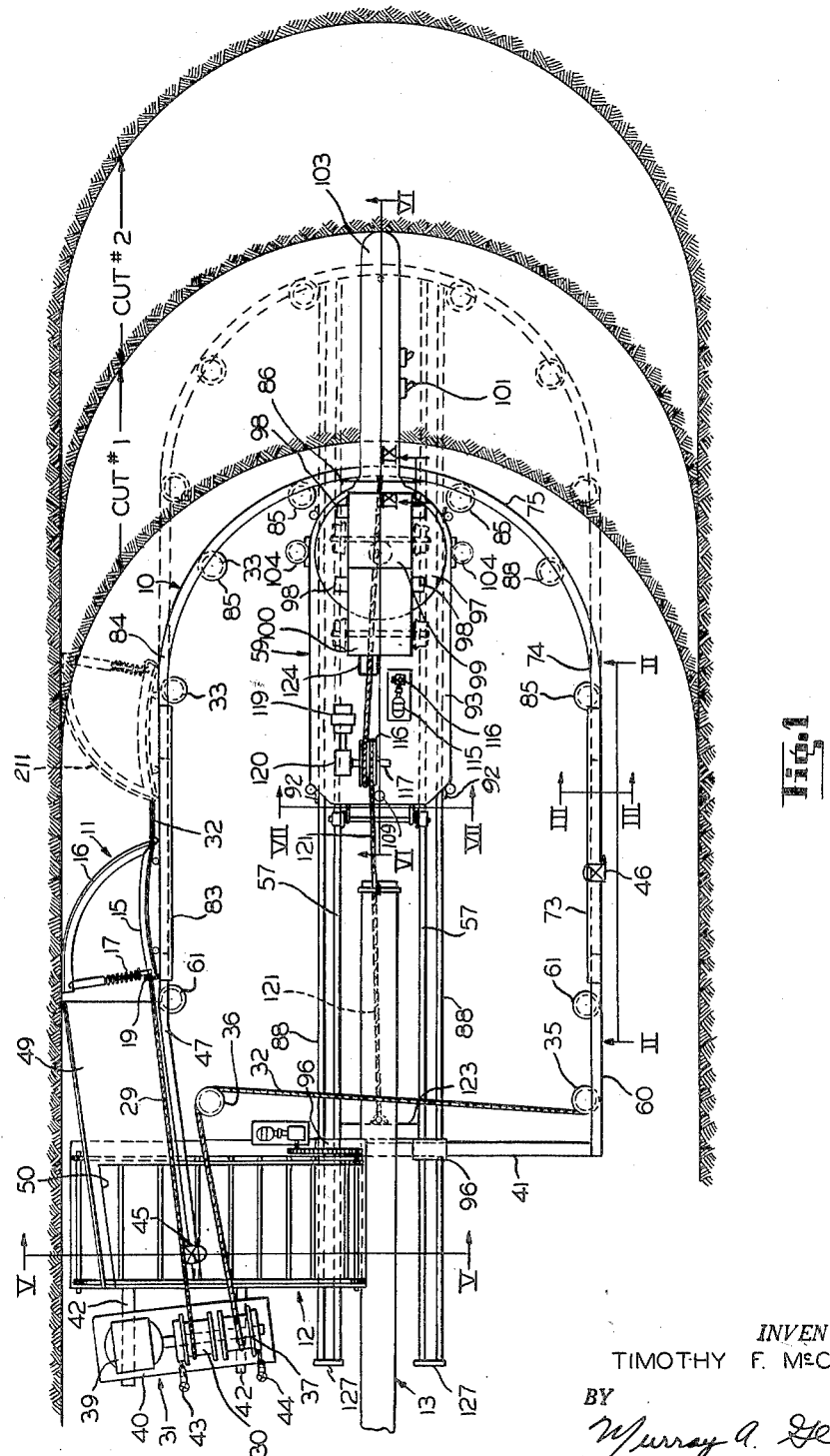

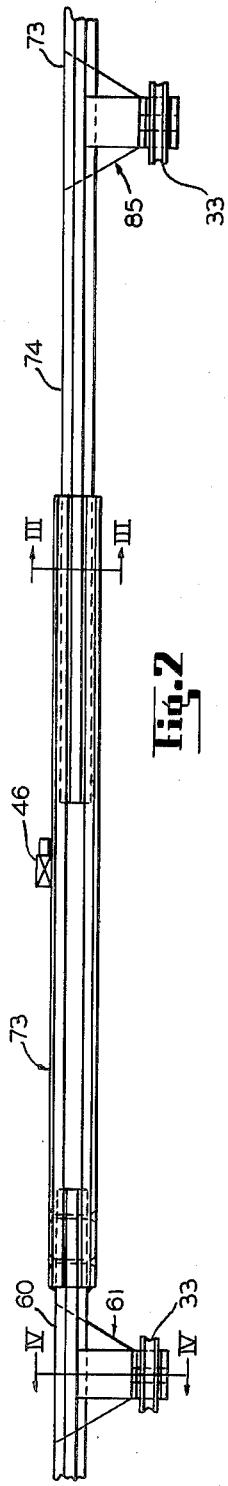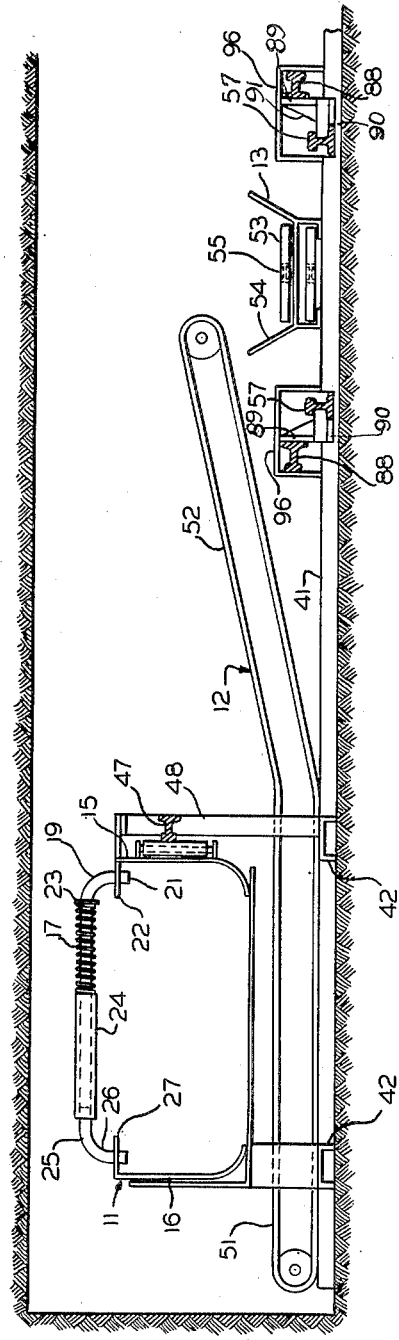

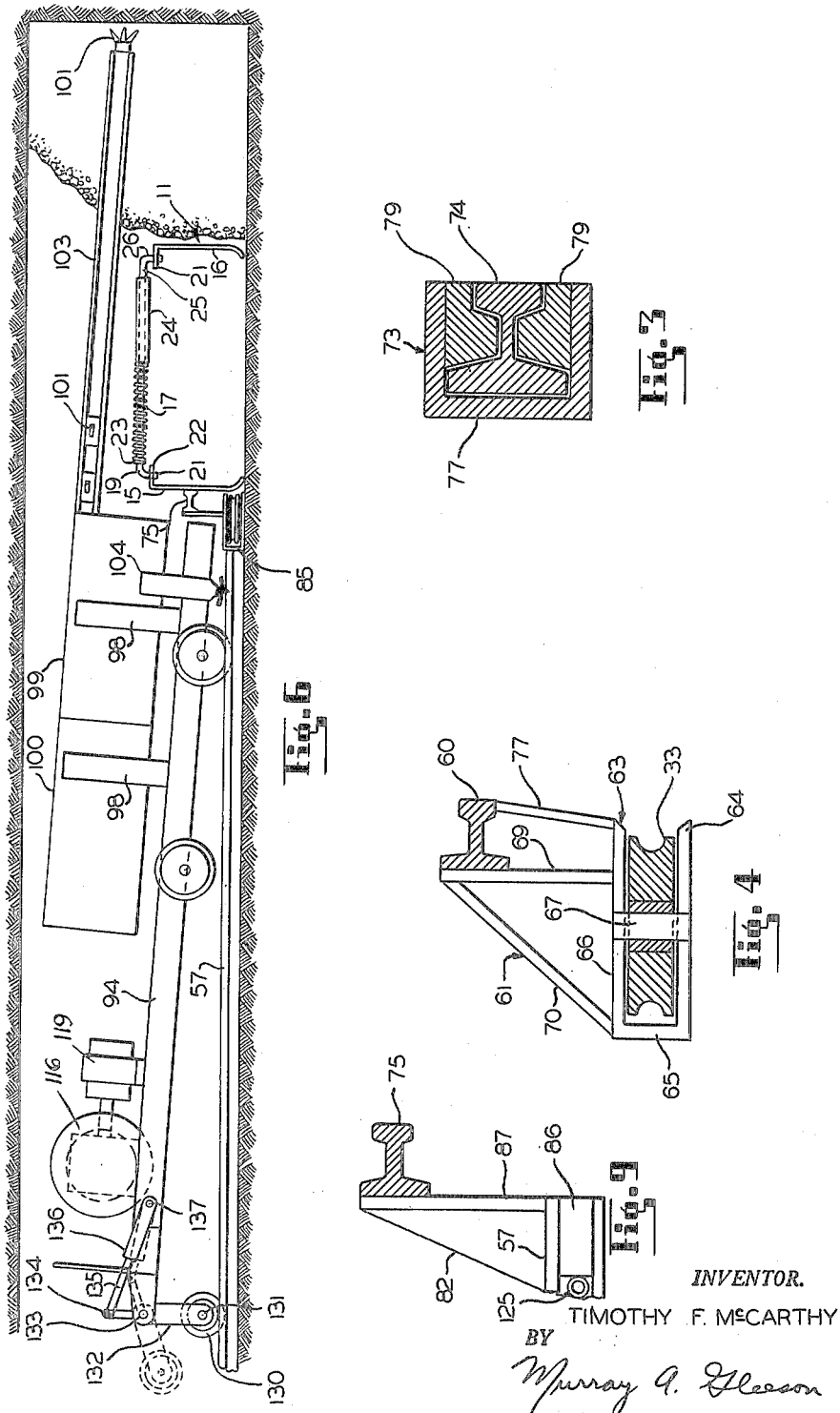

INVENTOR.
TIMOTHY F. McCARTHY
BY Murray G. Gleeson
ATTORNEY

United States Patent Office 2,770,378
Patented Nov. 13, 1956

2,770,378

SCRAPER LOADER APPARATUS FOR MINES

Timothy F. McCarthy, Indiana, Pa., assignor of one-tenth to Goodman Manufacturing Company, Chicago, Ill.

Application December 21, 1953, Serial No. 399,539

7 Claims. (Cl. 214—93)

This invention relates to improvements in scraper loader apparatus particularly adapted to handle loose material in mines underground, in which a scraper is guided for movement along a guide frame across a working place to load loose material therefrom.

A principal object of my invention is to provide a more efficient form of scraper loader apparatus for loading out a working place, in which the scraper loader apparatus performs a loading function only, and material transporting means are provided to transport the coal from the working place.

Still another object of my invention is to provide a novel form of scraper loader apparatus, in which the scraper is moved about a guide frame across a working face and away from the working face along the guide frame to a discharge position, and in which a simplified means is provided for extending or retracting the guide frame.

A still further object of my invention is to provide a novel and improved form of scraper loader apparatus in which the scraper moves about a guide frame for discharge onto a feeder conveyor spaced rearwardly from the working face and having an advance portion extensible and retractible with respect to the feeder conveyor and in which the feeder conveyor and means for operating the scraper are in a stationary operative position while advancing or retracting the guide frame during a complete cutting and loading cycle.

A further and important object of my invention is to provide a scraper loader apparatus in which the scraper is moved about a guide frame by flexible draft devices for discharge onto a material transporting means, and in which a kerf cutting machine is mounted on the guide frame for movement therealong, and in addition to its function of cutting may be lifted above the guide frame and serve as a guide therefor and a source of power for extending the guide frame as the loading operation progresses.

Another object of my invention is to provide a novel and improved form of wheel mounted kerf cutting machine having means for tipping the entire machine about its front wheels and positioning the cutter bar at an angle to break down hanging coal and pull the shot and broken down coal onto the runway for the scraper, to facilitate the loading of coal thereby.

Another object of my invention is to provide a simple and improved form of loading ramp for a scraper having a hinged side wall actuated by movement of the scraper for discharging the load from the ramp brought up by the scraper.

Still another object of my invention is to provide a novel and improved form of scraper loader apparatus including a guide frame extending across the coal face and so arranged as to accommodate oppositely operating scrapers to load the coal in opposite directions across a coal face.

A still further and more specific object of my invention is to provide a guide frame for a scraper loader having spaced extensible guide rails, and a head rail connecting said extensible guide rails together, together with a central track extending from said head rail and between said guide rails and forming a track for a kerf cutting machine, and also a guide means for guiding the frame during advance and retractible movement thereof.

These and other objects of my invention will appear from time to time as the following specification proceeds and with reference to the accompanying drawings wherein:

Figure 1 is a partial diagrammatic plan view of a loading apparatus constructed in accordance with my invention, showing the apparatus in position for loading from the working face of a mine;

Figure 2 is an enlarged fragmentary view in side elevation showing one of the guide rails of the guide frame, and looking substantially along the lines II—II of Figure 1;

Figure 3 is a sectional view taken through the telescoping joint of the side rail shown in Figure 2 and substantially along line III—III of Figure 2;

Figure 4 is a sectional view taken substantially along line IV—IV of Figure 2, and showing the support for the guide rail on the ground;

Figure 5 is a fragmentary sectional view taken substantially along line V—V of Figure 1;

Figure 6 is a fragmentary longitudinal sectional view taken substantially along line VI—VI of Figure 1 and showing the kerf cutting machine in position to rake the shot coal into the path of the scraper;

Figure 9 is a fragmentary sectional view taken substantially along line IX—IX of Figure 1.

Figure 8:
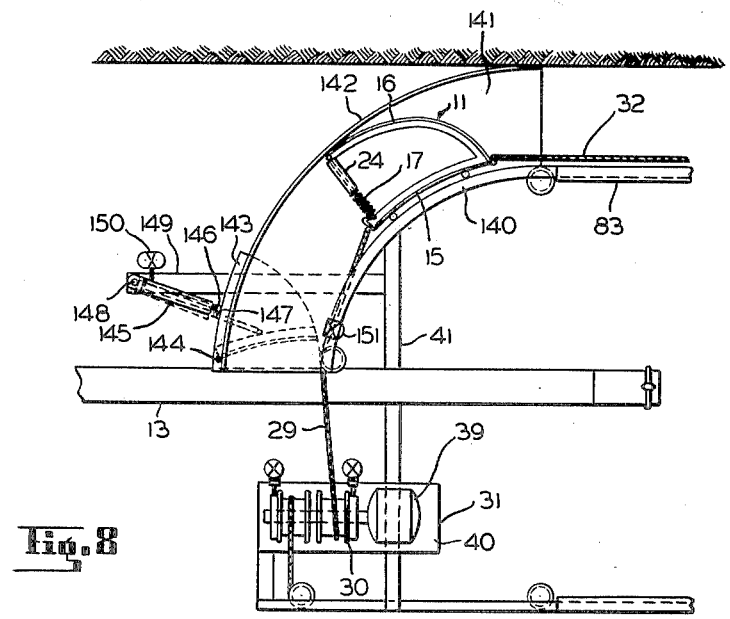
Figure 8 is a fragmentary plan view illustrating a modified form of loading ramp, for loading onto the main room conveyor.

In the embodiment of my invention illustrated in the drawings, I have shown a guide frame 10 positioned adjacent a working face of a mine for guiding a draft operated scraper 11 into and across the working face, and away from the working face to load material onto a transverse feeder conveyor 12 for transfer onto a room conveyor 13 extending from the working place to an entry or discharge position to load onto a main gathering conveyor.

The scraper 11 is herein shown as being a hinged type of scraper having an inner side wall 15 curved to substantially conform to the contour of the guide frame 10, and having an outwardly and forwardly curved outer side wall 16, pivotally connected to the rear end of said inner side wall.

The side walls 15 and 16 are shown as being biased in outwardly extending relation with respect to each other by a compression spring 17 on a transverse rod 19. As herein shown, the transverse rod 19 has a downturned end 21 pivotally mounted in an inwardly extending flange 22 of the inner side wall 15, and has a collar 23 adjacent its downturned end and abutting one end of the spring 17. The opposite end of the spring 17 abuts the inner end of a cylinder 24 in which the rod 19 is slidably movable. The cylinder 24 in turn has a rod 25 mounted at its outer end and having a downturned end 26 pivotally mounted in an inwardly extending flange 27 of the side wall 16 of the scraper 11.

The scraper 11 is shown as having a flexible draft device 29 connected to the advance end of the wall 15 at one of its ends and wound about a winding drum 30 of a double drum hoist 31. A second flexible draft device 32 is connected to the rear end of the scraper 11 and serves as a tail rope therefor. The tail rope 32 is trained from the scraper about the guide frame 10 along sheaves 33, 33, and along the far side of the guide in sheaves 33 and 35 and from the sheave 35 to a sheave 36 in alignment with a drum 37 of the double drum hoist 31. The second flexible draft device 32 or tail rope is shown as being suitably connected to said winding drum for moving the scraper 11 in a return direction along the guide frame 10.

The double drum hoist 31 may be of any well known form and may be remote controlled to effect reversal in the operation of the scraper 11 at either end of its path of travel along the guide frame 10 without attention from the operator. As herein shown the winding drums 30 and 37 are driven from a motor 39 under the control of suitable clutch means (not shown). The motor 39 is mounted on a base 40 for said winding drums. The base 40 in turn is connected to a tie bar 41 extending across the rear end portion of the guide frame 10, and connecting opposite sides of said guide frame together. Connecting members 42, 42 forming a support for the tail conveyor 12 are shown as connecting said base to said tie bar to effect the advance of the entire hoist upon the advance of the head frame.

The hoist may be remotely operated under the control of individual operating members indicated generally by reference characters 43 and 44, which may be valves controlling the admission of fluid under pressure to cylinders (not shown), controlling the operation of the hoist in a usual manner and no part of my present invention so not herein shown or described in detail. The valves 43 and 44 may be solenoid operated under the control of switches 45 and 46 at opposite ends of the head frame and operated by engagement with the scraper 11 to effect reversal of the direction of travel of the scraper at each end of its path of travel.

The scraper 11 is shown in Figure 1 as moving along a guide rail 47 spaced above the ground and extending along the inner side of a loading ramp 49 extending upwardly over the feeder conveyor 12 and having a discharge opening 50 therein for discharging material directly onto said feeder conveyor. The guide rail 47 is shown as extending upwardly over the feeder conveyor 12 and as being supported on an upright support 48, extending upwardly from the inner connecting member 42. The guide rail 47 thus forms a reaction member for the scraper as it moves upwardly along the ramp over the discharge opening 50 therein.

The feeder conveyor 12 is shown as being a well known form of chain and flight conveyor mounted on the connecting members 42, 42 and having a generally flat receiving end portion 51 extending beneath the discharge opening 50 and an inclined elevating portion 52 extending into material discharge relation with respect to the room conveyor 13. The feeder conveyor 12 is shown as being sufficiently wide to take care of an entire scoop of coal each time the scraper 11 is advanced upwardly along the ramp 49 in registry with the discharge opening 50, and may be any well known form of conveyor so need not herein be shown or described further.

The room conveyor 13 may be of a well known form of chain and flight conveyor of a type commonly used in mines underground, to transport coal from the working place onto a cross gathering conveyor at an entry or breakthrough extending from room to room. The room conveyor 13 is shown in Figure 5 as being a center strand chain and flight conveyor having a chain 55 having a plurality of spaced flights 53, 53 extending laterally therefrom and movable along an extensible trough line 54, as is common with such conveyors. The room conveyor 13 is herein shown as extending between two parallel spaced track rails 57, 57 forming a track for supporting a kerf cutting machine 59. The room conveyor 13 may extend within the rails 57, 57 a distance sufficient to accommodate the advance of the entire guide frame 10 and feeder conveyor 12 as the loading operation progresses, without extending the room conveyor 13.

The guide frame 10 includes the side rail 47 spaced outwardly from and extending along one track rail 57 and over the feeder conveyor 12, and shown as converging toward the track rail 57 as it extends along the ramp 49. The guide frame 10 also includes an opposite side rail 60, extending along the opposite side of the track rails 57, 57 from the guide rail 47. The guide rails 47 and 60 are spaced above the ground a distance sufficient to engage the inner wall 15 of the scraper 11 intermediate its ends and form a slidable reaction guide therefor and are connected together by the tie bar 41 extending transversely of the working place and resting on the ground. The room conveyor 13 extends over the tie bar 41 as shown in Figure 5, and is slidably movable therealong.

The guide rails 47 and 60 are shown as being supported in vertically spaced relation with respect to the ground forwardly of the tie bar 41 on pedestals 61, 61 (see Figure 4). The pedestals 61, 61 are each of similar construction so one only need herein be shown or described in detail.

The pedestals 61, 61 are best shown in Figures 2 and 4, and each includes a generally U-shaped housing 63 for a sheave 33. The housing 63 is shown as having a base plate 64 slidably engageable with the ground, a closed inner wall 65 and an upper plate 66 extending parallel to the base plate 64. The sheave 33 is shown as being mounted between the plates 64 and 66 on a vertical shaft 67 secured to the plates 64 and 65 at its ends. An upright support 69 is shown as extending vertically from the plate 66 and as being braced by an inclined brace 70. The guide rail 60 may be welded or otherwise secured to the support 69, in position to engage the inner side wall 15 of the scraper 11. The head of the rail is shown as being supported on the forward end of the plate 66 as by a brace 71 extending upwardly from the plate 66 to the underside of the head of the rail 60. The rail 60 has generally hollow extension and telescope guide member 73 extending forwardly therefrom and forming a slidable support or slip joint for a rectilinear end portion 74 of a head rail 75, curved to extend across the working place and forming the forward end portion of the guide frame 10.

The extension or telescopic guide member 73 is shown as comprising an outwardly opening box or channel-like member 77 extending over and secured to the forward end portion of the rail 60 and extending forwardly therefrom. The box or channel-like member 77 is of a size to slidably receive the base of the rail 74, and form a slidable support and guide therefor. Within the upper and lower walls of the channel-like member 77 are filler strips or guides 79, 79 conforming to the form of the web and facing sides of the base and head of the rail 74 and forming a slidable guide for said rail and retaining it to the telescopic guide member 73 (see Fig. 3). The rectilinear portion 74 of the head rail 75 is thus slidably supported in the telescopic guide member 73 for extensible movement with respect thereto, to accommodate extension of the head rail, while the feeder conveyor 12 and room conveyor 13 remain stationary.

The rail 47 likewise has a hollow extension or telescopic guide member 83 extending forwardly therefrom having a rectilinear end portion 84 of the head rail 85 slidably or telescopically mounted therein, for extensible and retractable movement with respect thereto. The extension 83 may be like the extension 73 so need not herein be shown or described further.

The portion of the head rail 75 between the rectilinear rail portions 74 and 84 is shown as being in the form of an arc, although it need not be so formed as long as a regular guide is provided between said head rail and the side rails 47 and 60. The head rail 75 like the side rails 47 and 60 is supported in spaced relation with respect to the ground on pedestals 85, 85 carrying the guide sheaves 33, 33 therein, which may be like the pedestals 61, 61 so not herein shown or described further.

The track rails 57 forming the support for the track mounted kerf cutting machine 59 are shown as being secured to the head rail 75 at their forward ends, to be extended within said head rail upon extension thereof. As shown in Figure 9, the track rails 57 are connected together at their forward ends by a tie bar 86 and have upright supports 87, 87 extending upwardly from the heads of the rails and welded thereto. The head rail 75 is shown as being welded at its base to the outsides of the upright supports 87, 87. A gusset plate 82 is shown as being provided to brace the support 87 and rail 75.

Figure 7:
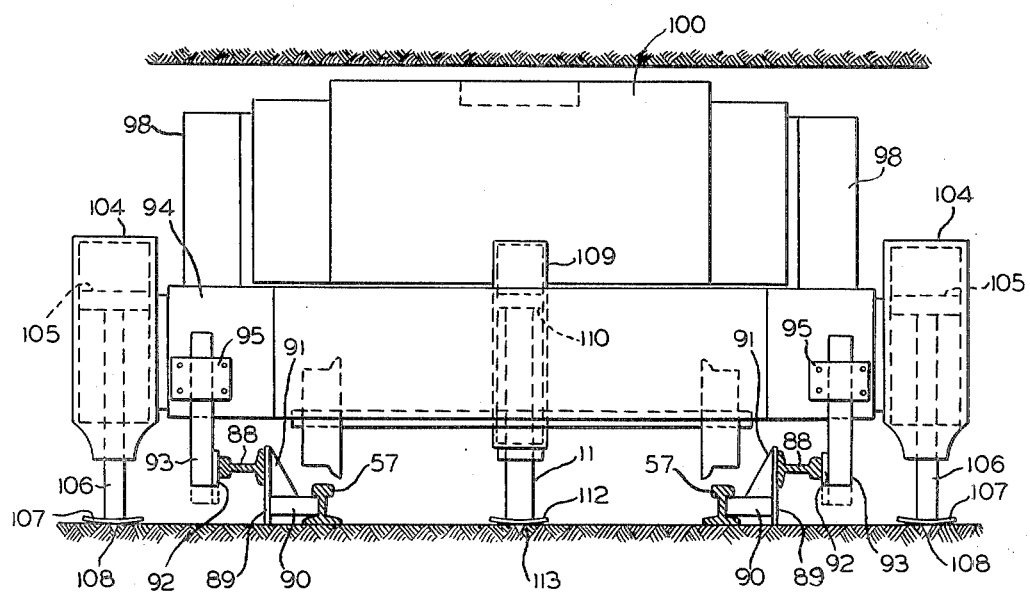
Figure 7 is a transverse sectional view taken substantially along line VII—VII of Figure 1, and showing the kerf cutting machine elevated above its supporting track rails.

The track rails 57, 57 are also shown as having parallel guide rails 88, 88 extending along the outer sides thereof in lateral and vertically spaced relation with respect thereto. As shown in Figures 5 and 7, the guide rails 88, 88 are mounted on the upper end portions of upright supports 89, 89 extending therealong for substantially the length thereof. The supports 89, 89 are shown as being secured to the outer ends of spacer plates 90, 90 secured to the webs of the rails 57, 57 as by welding and extending outwardly therefrom. The supports 89, 89 are shown as being braced by gusset plates 91, 91 connected between the plates 90 and the insides of the supports 89.

The guide rails 88, 88 are shown in Figures 1 and 7 as being slidably engaged by guide shoes 92, 92 on the lower end portions of depending supports 93, 93. The supports 93, 93 are shown as depending from opposite sides of the forward and rear end portions of a truck frame 94 of the kerf cutting machine 59. As shown in Figures 1, 6 and 7, four of such guide shoes are provided, two being at the forward end of the truck frame 94 and the others being at the rear end thereof. The supports 93, 93 may be adjustably secured to the truck frame 94 as by U-clips 95, 95 bolted or otherwise secured to said truck frame.

The track rails 57, 57 are shown in Figure 5 as extending over and as being partially recessed within the tie bar 41 and as being guided and maintained in parallel relation with respect to each other by downwardly opening channelled guides 96, 96 extending over the rails 57 and 88 and slidably engaging the outsides or heads of the guide rails 88, 88. The downwardly opening chanelled guides 96, 96 may be secured at their open ends to the tie bar 41 as by welding.

Referring now in particular to the kerf cutting machine 59, this machine serves not only to undercut the coal for shooting and for loading by the scraper 11, but also serves as a guide means for the entire guide frame during extensible and retractable movement thereof and as a source of power for extending or retractably moving the head frame. Said kerf cutting machine is preferably track mounted, and may be a form of kerf cutting machine commonly called a slabbing or arc face machine, or may be a truck mounted short wall machine. As herein shown, a turntable 97 is mounted at the forward end of the truck frame 94 for turning movement with respect thereto about a vertical axis. The turntable 97 is shown as having spaced guide frames 98, 98 extending upwardly therefrom and forming a guide for a cutting element indicated generally by reference character 99. The cutting element 99 may be of a well known form having a motor 100 at the rear end thereof driving a cutter chain 101 about a cutter bar 103, projecting forwardly from the forward end of the machine.

At the forward end of the truck frame 94 and extending along each side thereof are a pair of fluid pressure jacks comprising cylinders 104, 104 secured to said truck frame and having pistons 105, 105 movable therein. Piston rods 106, 106 are shown as depending from the pistons 105, 105 for extensible movement from the bottoms of said cylinders. The piston rods 106, 106 are shown as having ground engaging shoes 107, 107 at the bottoms having tapered ground-engaging pins 108, 108 depending therefrom for engagement with the mine bottom to hold the shoes 107, 107 stationary.

At the rear of the truck frame and at the center thereof is a hydraulic cylinder 109 having a piston 110 slidably movable therealong with a piston rod 111 extending therefrom through the bottom of the cylinder 109. The piston rod 111 is shown as having a ground engaging shoe 112 at its lower end having a tapered pin 113 extending downwardly therefrom for engagement with the mine bottom for holding said shoe and the kerf cutting machine in position. The cylinders 104, 104 and 109 are shown as being double acting cylinders and are provided to lift the entire kerf cutting machine above the track rails 57, 57 to the position shown in Figure 7, when it is desired to extend the guide frame 10. Upon lifting of the machine the tapered pins 108, 108 and 113 will be forced into the mine bottom by the weight of the machine to positively hold the kerf cutting machine from movement. When the kerf cutting machine has been lifted above the track rails 57, 57 and is held from movement with respect to the mine bottom, the shoes 92, 92 engaging the heads of the guide rails 88, 88 at spaced apart points will serve as a slidable guide for said rails to guide the entire guide frame in cooperation with the downwardly opening channels 96, 96 during extensible movement thereof.

The truck frame 93 is shown as having a motor 115 and a pump 116 driven thereby for supplying fluid under pressure to the hydraulic cylinders 104, 104 and 109 under the control of suitable valve means (not shown) in a well known manner and forms no part of my present invention, so is not herein shown or described.

A means is provided on the truck frame 93 to provide power to advance or retractably move the guide frame 10, which is herein shown as being a winding drum 116 mounted on a transverse shaft 117 journaled on said truck frame and driven from a motor 119 and speed reducer 120 in a well known manner, so not herein shown or described further.

The winding drum 116 is shown as having a flexible draft device such as a cable 121 wound thereabout for a complete turn. One end of the cable 121 is shown as being anchored to a rearwardly spaced cross member 123 connecting the rails 57, 57 together. The opposite end of the cable 121 is shown as extending through an opening 124 of the truck frame 94, and as being anchored to an anchoring member 125 connected to the tie bar 86 extending across the rails 57, 57 at the point of connection thereof with the head rail 75.

Thus when the kerf cutting machine 59 is raised above the track rails 57, 57 by the jacks 104, 104 and 109, and the motor 119 is energized to drive the winding drum 116 in the proper direction, the flexible draft device 121 will slidably extend the rails 57, 57 and head rail 75 along the mine bottom, the rectilinear portions 74 and 84 of the head rail 75 extensibly moving along the telescopic guides or slip joints 73 and 83. Reverse rotation of the winding drum 116 will retractably move the head rail 75 rectilinear portions 74 and 84 thereof in an obvious manner.

The track rails 57, 57 and guide rails 88, 88 are provided with stop plates 127, 127 at their rear ends, engageable with the tie bar 41, and inverted channel guides 96, 96 upon extensible movement of the rectilinear portions 74 and 84 of the head rail along the slip joints 73 and 83 to the limit of extension thereof. Continued rotation of the winding drum 116 will then advance the guide rails 47 and 69, the feeder conveyor 12 and the hoist 31 toward the working face.

When it is desired to advance the entire unit up to the face, pressure may be released from the piston rod ends of the jacks 104, 104 and 109. The kerf cutting machine 59 may then be advanced along the track to a position adjacent the head rail 75, and may then again be lifted by the jacks 104, 104 and 109. Operation of the winding drum 116 will then advance the tie bar 41, feeder conveyor 12 and hoist 31, telescoping the rail portions 74 and 84 within the slip joints or telescopic guides 73 and 83. Continued operation of the winding drum 116 will then advance the entire unit toward the working place to the position desired. It is, of course, obvious that each time the unit has been advanced to the end of the effective travel of the draft device 121, the kerf cutting machine must be advanced along the track 57 to a new location.

In Figure 6, I have shown a tilting arrangement for tilting the cutter bar 103 to enable the cutter chain 101 to break down hanging coal and sweep the broken-down and shot coal in the path of the scraper 11 both by operation of the cutter chain and by swinging movement of the entire cutter bar back and forth by operation of the turntable 97. The machine 59 is shown as having a pair of tilting wheels 130, 130 at the rear end of the truck frame 94, which are shown as being track wheels engageable with the rails 57, 57. The tilting track wheels 130, 130 are mounted on a transverse shaft or axle 131 carried on the lower ends of two spaced lever arms 132, 132. The lever arms 132, 132 are mounted on a pivot shaft 133 and may be pinned or otherwise secured thereto to be pivoted thereby upon rocking movement of said shaft. The shaft 133, is shown as being rocked by a lever arm 134 which may be pinned or otherwise secured thereto, and is shown in Figure 6 as extending upwardly therefrom and having a piston rod 135 pivotally connected thereto adjacent its upper end. The piston rod 135 is shown as being extensible from a hydraulic cylinder 136 pivotally mounted at its head end to the truck frame 94 on a pivot pin 137. The cylinder 136 and the piston therein are double acting and when fluid under pressure is admitted to one end of the cylinder 136, which in the present instance may be the head rod end of said cylinder, the arms 132, 132 will be swung in a counterclockwise direction from the dotted line position shown in Figure 6, into engagement with the track rails 57, 57 to tilt the entire machine about the front wheels thereof, and position the cutter bar 103 in a downwardly inclined position to sweep the coal into the path of the scraper 11 when desired or required.

In Figure 8 of the drawings, I have shown a modified form of loading ramp in which the coal is loaded directly onto the room conveyor 13. In this form of my invention, a curved side rail 140 is shown as extending rearwardly from the slip joint or telescopic guide 83 toward the conveyor 13. A curved ramp or chute 141 is shown as extending along and outwardly from the rail 140 and conforming to the form thereof to a material discharge position with respect to the conveyor 13. The ramp 141 also has an outer side wall 142 conforming generally to the curvature of the rail 140.

At the discharge end of the ramp 141 is a scraper 143 forming the rear end portion of the side wall 142 when in a retracted position and forming a continuation thereof. The scraper 143 is shown as being pivoted to the ramp 141 adjacent the discharge end thereof, as by a pivot pin 144 for pivotal movement transversely of the ramp, to scrape the loose material discharged by the scraper 11 onto the room conveyor 13.

The scraper 143 is shown as being operated by a hydraulic cylinder 145 having a piston rod 146 extensible therefrom and pivoted to the scraper 143 intermediate the ends of said scraper on a pivot pin 147. A pivot pin 148 pivotally mounts the head end of the cylinder 145 on a frame member 149 secured to and extending rearwardly from the tie bar 41 and forming a support for the ramp 141. Fluid under pressure may be admitted to the head and piston rod ends of the cylinder 145 under the control of valve means shown diagrammatically in Figure 8 and indicated generally by reference character 150. The valve means 150 may be automatically operated by limit switch diagrammatically shown and indicated generally by reference character 151, to cause the scraper 143 to move across the ramp to discharge loose material therefrom as the scraper 11 reverses its path of travel. The valve means may be operated to return the scraper to its initial position in alignment with a side wall 142 by operation of the switch 46 on the rail 60 as the scraper reverses its direction of travel to pick up a new load along the head rail 75.

In Figure 1 of the drawings I have shown by dotted lines, a scraper 211 like the scraper 11, and facing in an opposite direction from the scraper 11. The purpose of showing this scraper is to illustrate that by the use of a duplicate feeder conveyor like the feeder conveyor 12 on the opposite side of the room conveyor 13 from the conveyor 12, or by the use of a duplicate curved loading ramp 141, that the device may be utilized to load in each direction of travel of the scrapers. That is, one scraper 11 will load when traveling in one direction and the other scraper 211 will load when the direction of travel of the first scraper is reversed.

Referring now in particular to the use and operation of the device of my invention, assuming cut number 1 shown in Figure 1 of the drawings has been completely loaded out and that the guide frame 10 is in its retracted position shown in Figure 1, the kerf cutting machine 59 may be elevated above the track rails 57, 57 by the jackets 104, 104 and 109 to the position shown in Figure 7. The head rail 10 and track rails 57, 57 may then be extended by the draft device 121 to the position shown by dotted lines in Figure 1. The kerf cutting machine may then be lowered until its track wheels are on the track rails 57, 57. The machine may then propel itself into contact with the head end of the guide frame 10 in the same relation with respect to said frame as is shown by solid lines in Figure 1. The cutter bar 103 may then be positioned at right angles to the track to make an arcuate cut in a conventional manner. When the face has been cut, the cutter bar 103 is withdrawn from the kerf by propelling the machine rearwardly along the track rails 57, 57 a distance substantially equal to the depth of the kerf cut. The machine may then be lifted off the track by operation of the hydraulic jacks 104, 104 and 109. The guide frame may then be retractably moved to the position shown by solid lines in Figure 1 by operation of the draft device 121 and reverse operation of the winding drum 116 from the direction required to extend the guide frame. This retractible movement of the guide frame is to make room for the scraper to load out the machine cuttings.

The hoist 31 may then be put in operation to load the machine cuttings by movement of the scraper back and forth along the head rail 75 and the side rail 47 to load the cuttings onto the feeder conveyor 12. As the cuttings are being loaded out, the head rail 75 may be advanced from time to time by operation of the flexible draft device 121. When the cuttings are completely loaded out, the head rail 75 may be retractably moved to the position shown by solid lines in Figure 1. The working face may then be drilled and shot. Loading may then be resumed as in the case when loading out the machine cuttings, the head rail 75 being advanced from time to time to completely clean out the shot coal from the working face. During this loading operation, after the head rail 75 has been advanced to its full length of extension, the side rails 47 and 60 as well as the ramp 49, feeder conveyor 12 and hoist 31, may be advanced by engagement of the stop plates 127 with the tie bar 41 and guides 96, 96.

During this loading operation, if the coal should not be fully shot down, and as an aid to facilitate loading, the tilting wheels 130, 130 may be brought into operation to tilt the truck frame 94 and cutter bar 103, and enable said cutter bar to rake the cuttings into the path of the scraper 11, and break down any coal which may be hanging from the roof or face of the working place.

It should be understood, however, that during the raking or breaking operation by the cutter bar 103 the machine must be lowered, so its track wheels are in engagement with the track rails 57, 57, and that the machine must again be lifted by its jacks 104, 104 and 109, when it is again necessary to extend the head rail 75.

It will be understood that various modifications and variations of the present invention may be effected without departing from the spirit and scope of the novel concepts thereof.

I claim as my invention:

1. In a scraper loading apparatus for coal and the like, a guide frame extending along opposite ribs of a working place of a mine and having a head frame extending across the working face of the working place, said guide frame having parallel spaced side guide rails mounted in spaced relation with respect to the floor, and a head rail carried by said side guide rails for extensible movement with respect thereto and connecting said guide rails together, means for advancing and retractibly moving said head rail along the floor, and for extending said side guide rails toward a working face, a scraper reciprocally movable along said head rail and said side guide rails, a hoist spaced rearwardly of one of said side guide rails, a motor for operating said hoist, flexible draft devices connected from said hoist to opposite ends of said scraper and trained about said guide frame for reciprocally moving said scraper therealong, a ramp extending along one of said side rails into a material discharge position, and reversing switches on said side guide rails controlling operation of said hoist for reversing the travel of said scraper along said guide frame at opposite ends of the path of travel thereof.

2. In a scraper loading apparatus, a room conveyor, a feeder conveyor extending at an angle with respect thereto and positioned in material discharge relation with respect to said room conveyor, a guide frame extending along each side of and in advance of said room conveyor and having said feeder conveyor connected thereto, a scraper movable about said guide frame, a hoist and flexible draft devices operated thereby for reciprocally moving said scraper along said guide frame, said guide frame having a head rail supported on the floor in vertically spaced relation with respect thereto and extending across a working face of a mine and forming a guide and reaction means for said scraper during movement thereof along the working face, said head frame having spaced side guide rails extending along opposite sides of said room conveyor and having telescopic connection with said head rail, and accommodating extensible and retractable movement of said head rail with respect to said side guide rails, and one of said side guide rails extending over said feeder conveyor and reacting against said scraper for the discharge of material onto said feeder conveyor.

3. In a scraper loader apparatus for coal and the like, a guide frame adapted to extend along opposite ribs of a working place of a mine and across the working face of a mine and comprising spaced side guide rails supported on the ground in vertically spaced relation with respect thereto, a tie bar connecting said side guide rails together, adjacent the rear ends thereof and supporting the rear ends thereof in vertically spaced relation with respect to the ground, a head rail extending across the working face and supported in vertically spaced relation with respect to the ground for movement therealong and being connected with said side guide rails for extensible movement with respect thereto, flexible draft devices for moving said scraper along said rails, means for retaining said head rail in position during loading and for advancing the same comprising parallel spaced track rails extending along said guide frame inwardly of said side guide rails and beyond the rear end of said tie bar, slidable guiding connections between said track rails and said tie bar, a tie for tying said track rails together, a winding drum, power means for driving said winding drum, and a flexible draft device wound on said winding drum and connected to said tie for extending said track rails and head rails toward a working place, and stops on said track rails engageable with said tie bar for retractibly moving said side guide rails with respect to said head rail and advancing said side guide rails toward the working face.

4. In a scraper loader apparatus for coal and the like, a guide frame having parallel spaced side rails adapted to extend within and along opposite ribs of a working place of a mine, a tie bar connecting said side rails together adjacent the rear ends thereof, a head rail adapted to extend across a working face of a mine and having telescopic connection with said side rails and forming a forward continuation thereof, means for mounting said side rails and said head rail in vertically spaced relation with respect to the ground and for advancing movement along the ground, a scraper guided for reciprocal movement along said side guide rails and head rail, parallel spaced track rails for a kerf cutting machine and the like, extending rearwardly from said head rail beyond said tie bar and having supporting connection with said head rail at their forward ends, guide rails extending parallel to said track rails, and secured thereto and spaced vertically therefrom, guide means on said tie bar having slidable guiding engagement with said guide rails, a tie tying said track rails together, a winding drum having a flexible draft device wound thereabout having connection at one of its ends with said head rail and at its opposite end with said tie for extensibly and retractibly moving said head rail and for advancing said side rails by engagement with said track rails and guide rails with said tie bar upon advancing movement of said track rails.

5. In a head frame particularly adapted for a scraper loader apparatus operable in a working place of a mine, two laterally spaced longitudinally extending side guide rails, means for supporting said side guide rails in vertically spaced relation with respect to the ground and for advancing movement along the ground, a head rail adapted to extend across the working face of a mine, and having opposite rectilinear end portions forming a continuation of said side guide rails and a curved guide portion connecting said end portions together, means for supporting said head rail in vertically spaced relation with respect to the ground and for slidable movement along the ground, telescopic connections between said side guide rails and said rectilinear end portions of said head rail, track rails extending between said guide rails and having connection with said head rail and extending rearwardly beyond the rear ends of said side guide rails, a tie bar connecting said side guide rails together, guide members on said tie bar having slidable guiding engagement with said track rails, and accommodating extensible movement of said head rail and track rails with respect to said tie bar and side guide rails, and stops on said track rails engageable with said guide members on said tie bar for advancing said side guide rails with said track rails after a predetermined advance of said track rails.

6. In a head frame particularly adapted for a scraper loader apparatus operable in a working place of a mine, two laterally spaced longitudinally extending side guide rails, means for supporting said side guide rails in vertically spaced relation with respect to the ground and for advancing movement along the ground, a head rail adapted to extend across the working face of a mine, and having opposite rectilinear end portions forming a continuation of said side guide rails and a curved guide portion connecting said end portions together, means for supporting said head rail in vertically spaced relation with respect to the ground and for slidable movement along the ground, telescopic connections between said side guide rails and said rectilinear end portions of said head rail, track rails extending between said guide rails and having connection with said head rail and extending rearwardly beyond the rear ends of said side guide rails, a tie bar connecting said side guide rails together, guide rails secured to said track rails and spaced upwardly and outwardly therefrom and extending therealong for the length thereof, means adjacent said head rail having slidable guiding engagement with said last mentioned guide rails, and guide members on said tie bar having slidable guiding engagement with said last mentioned guide rails and accommodating a predetermined extension of said head rail and track rails with respect to said side guide rails.

7. In a head frame particularly adapted for a scraper loader apparatus operable in a working place of a mine, two laterally spaced longitudinally extending side guide rails, means for supporting said side guide rails in vertically spaced relation with respect to the ground and for advancing movement along the ground, a head rail adapted to extend across the working face of a mine, and having opposite rectilinear end portions forming a continuation of said side guide rails and a curved guide portion connecting said end portions together, means for supporting said head rail in vertically spaced relation with respect to the ground and for slidable movement along the ground, telescopic connections between said side guide rails and said rectilinear end portions of said head rail, track rails extending between said guide rails and having connection with said head rail and extending rearwardly beyond the rear ends of said side guide rails, a tie bar connecting said side guide rails together, guide rails secured to said track rails and spaced upwardly and outwardly therefrom and extending therealong for the length thereof, means adjacent said head rail having slidable guiding engagement with said last mentioned guide rails, guide members on said tie bar having slidable guiding engagement with said last mentioned guide rails and accommodating a predetermined extension of said head rail and track rails with respect to said side guide rails, and stopping members connected across the rear ends of said track rails and said side guide rails for engagement with said tie bar, and guide members for limiting extensible movement of said track rails and head rail, and effecting movement of said tie bar and side guide rails upon continued advance of said track rails.

References Cited in the file of this patent

UNITED STATES PATENTS

| | | |
|---|---|---|
| 768,607 | Labelle | Aug. 30, 1904 |
| 1,534,795 | McClevey | Apr. 21, 1925 |
| 1,589,727 | Travell | June 22, 1926 |
| 1,680,242 | Beaumont | Aug. 7, 1928 |
| 2,195,544 | Stahl et al. | Apr. 2, 1940 |
| 2,414,412 | McCarthy | Jan. 4, 1947 |
| 2,678,204 | Osgood | May 11, 1954 |